United States Patent [19]

Suzuki

[11] Patent Number: 5,457,587
[45] Date of Patent: Oct. 10, 1995

[54] METHOD AND SYSTEM FOR CORRECTING OFFSET OF HEAD POSITION SIGNAL

[75] Inventor: Nobuyuki Suzuki, Kawasaki, Japan

[73] Assignee: Fujitsu Limited, Kawasaki, Japan

[21] Appl. No.: 250,111

[22] Filed: May 26, 1994

Related U.S. Application Data

[63] Continuation of Ser. No. 766,098, Sep. 27, 1991, abandoned.

[30] Foreign Application Priority Data

Dec. 21, 1990 [JP] Japan ................... 2-412640

[51] Int. Cl.[6] .................................................. G11B 5/596
[52] U.S. Cl. ........................ 360/77.04; 360/77.01
[58] Field of Search ........................ 360/75, 77.01–77.08, 360/66

[56] References Cited

U.S. PATENT DOCUMENTS

| 4,907,109 | 3/1990 | Senió .......................... 360/77.04 |
| 5,109,502 | 4/1992 | Sasamoto et al. ............ 360/77.04 |
| 5,138,594 | 8/1992 | Fennema et al. ............ 369/44.29 |
| 5,153,787 | 10/1992 | Sidman ....................... 360/77.08 |

FOREIGN PATENT DOCUMENTS

| 0154085 | 9/1985 | European Pat. Off. . |
| 0243729 | 11/1987 | European Pat. Off. . |
| 0298475 | 1/1989 | European Pat. Off. . |

Primary Examiner—Andrew L. Sniezek
Assistant Examiner—Thang V. Tran
Attorney, Agent, or Firm—Staas & Halsey

[57] ABSTRACT

An offset correcting method corrects an offset of a position signal generating circuit which generates a position signal indicative of a position of a magnetic head on a magnetic disk based on servo signal read from the magnetic disk in a magnetic disk unit. The offset correcting method includes the steps of measuring an offset value of the position signal generating circuit, storing the measured offset value in a storing part, and correcting an output value of the position signal generating circuit based on the offset value which is read from the storing part.

14 Claims, 9 Drawing Sheets

METHOD AND SYSTEM FOR CORRECTING OFFSET OF HEAD POSITION SIGNAL

This application is a continuation of application Ser. No. 07/766,098, filed Sep. 27,1991, now abandoned.

BACKGROUND OF THE INVENTION

The present invention generally relates to methods and systems for correcting offset of a head position signal, and more particularly to a method of correcting an offset of a head position signal which indicates a head position in a magnetic disk unit and is output from a position signal generating circuit, and a system for correcting the offset of the head position signal using this method.

A description will be given of a conventional method of reading a servo pattern signal which is recorded on servo cylinders of a magnetic disk using a magnetic head and generating a head position signal, by referring to FIGS. 1 and 2. FIG. 1 shows a servo pattern of the servo cylinders, and FIG. 2 shows an output signal waveform of a position signal generating circuit.

In order to match the position of a magnetic head on a track of the magnetic disk, the servo pattern signal is recorded on the servo cylinders of the magnetic disk as indicated by Odd and Even in FIG. 1. When the magnetic disk rotates in a direction X and the magnetic head traverses the servo pattern signal, a voltage is induced according to the Fleming's rule, thereby enabling the read out of the servo pattern signal. The voltage induced at the magnetic head is proportional to a magnetic flux density intersecting coils of the magnetic head. Accordingly, when the magnetic head is positioned at a point A corresponding to a center part of the signal Odd of the servo pattern, the induced voltage is a maximum with respect to the signal Odd and is zero with respect to the signal Even.

On the other hand, when the magnetic head is positioned at a point C, the induced voltage with respect to the signal Odd is zero and is a maximum with respect to the signal Even. In addition, when the magnetic head is positioned at a point B, the induced voltage with respect to the signals Odd and Even are the same but this induced voltage is relatively small.

When a difference of the induced voltages of the signals Odd and Even is obtained and the magnetic head is moved based on this difference, the difference of the induced voltages changes in a sinusoidal form as indicated by A in FIG. 2.

According to the conventional position signal generating circuit, the servo pattern of the servo cylinders is read in the above described manner, and a track center is described by a point where the difference of the induced voltages is zero. Hence, the difference of the induced voltage indicates the deviation of the magnetic head from the track center.

The use of data processing systems is becoming more and more popular, and there are increased demands on the magnetic disk units. That is, there are demands to reduce the size of the magnetic disk unit and to store data in the magnetic disks of the magnetic disk unit with a high density.

The position signal generating circuit described above includes an amplifier circuit for amplifying the induced voltages which are extremely small, an operational amplifier circuit for generating a signal which is dependent on the difference of the induced voltages, and a filter for eliminating noise and the like. But when the size of the magnetic disk unit is reduced by reducing the size of these circuits which form the position signal generating circuit, an offset is introduced in the position signal which is output from the position signal generating circuit due to an increase in temperature, aging and the like of the circuits.

When the position signal is offset as indicated by B in FIG. 2, the position of the magnetic head where the position signal becomes zero deviates from the true track center. As a result, although the true track centers are located at the positions A, B and C in FIG. 2, positions A', B' and C' are respectively detected as the track centers. In this case, the magnetic head reads or writes data at a position which is actually deviated from the true track center, and there are problems in that the magnetic head causes undesirable effects on adjacent tracks and that the induced voltage of the read data decreases and generates a large number of errors.

On the other hand, when the data is stored on the magnetic disk with a high density, the interval of the tracks formed on the magnetic disk, that is, the track pitch, becomes extremely small. For this reason, even if the offset value is within a conventionally tolerable range, there is a problem in that the offset value becomes too large because of the extremely small track pitch and undesirable effects are caused on the adjacent tracks.

SUMMARY OF THE INVENTION

Accordingly, it is a general object of the present invention to provide a novel and useful method and system for correcting offset of a head position signal, in which the problems described above are eliminated.

It is an object of the present invention to provide a method and a system for correcting offset of a head position signal, in which the track pitch can be made extremely small without introducing the problems described above.

Another and more specific object of the present invention is to provide a method of correcting an offset of a position signal generating circuit which generates a position signal indicative of a position of a magnetic head on a magnetic disk based on a servo signal reproduced from the magnetic disk in a magnetic disk unit, comprising the steps of measuring an offset value of the position signal generating circuit, storing the measured offset value in a storing part, and correcting an output value of the position signal generating circuit based on the offset value which is read from the storing part. According to the method of the present invention, it is possible to constantly obtain a correct position signal and thereby minimize an error during a data read/write operation.

Still another object of the present invention is to provide an offset correcting system for correcting an offset of a position signal generating circuit which generates a position signal indicative of a position of a magnetic head on a magnetic disk based on a servo signal reproduced from the magnetic disk in a magnetic disk unit, comprising offset measuring means, coupled to the position signal generating circuit, for measuring an offset value of the position signal generating circuit, offset storing means for storing the offset value measured by the offset measuring means, and offset correcting means for correcting an output value of the position signal generating circuit based on the offset value which is read from the offset storing means. According to the offset correcting system of the present invention, it is possible to constantly obtain a correct position signal and thereby minimize an error during a data read/write operation.

Other objects and further features of the present invention will be apparent from the following detailed description when read in conjunction with the accompanying drawings.

DESCRIPTION OF THE PREFERRED EMBODIMENTS

First, a description will be given of an operating principle of the present invention, by referring to FIG. 3.

Figure 3:
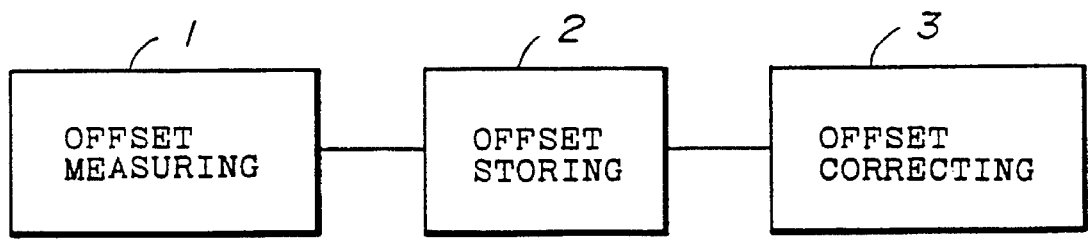
FIG. 3 is a system block diagram for explaining an operating principle of the present invention.

FIG. 3 shows an offset measuring part 1, an offset storing part 2, and an offset correcting part 3. The offset measuring part 1 measures an offset value of a position signal generating circuit which generates a position signal indicative of a position of a magnetic head on a magnetic disk. The offset storing part 2 stores the offset value which is measured by the offset measuring part 1. The offset correcting part 3 reads the offset value which is stored in the offset storing part 2, and corrects an output value of the position signal generating circuit based on the offset value.

The offset measuring part 1 measures the offset value of the position signal generating circuit before the magnetic disk unit starts a normal operation, or by using a free time in which no data read/write process is carried out in the magnetic disk unit. When the magnetic disk unit starts the normal operation, the offset correcting part 3 reads the offset value from the offset storing part 2, and corrects the output value of the position signal generating circuit based on the offset value. As a result, it is possible to always obtain a correct position signal and minimize an error generated during the data read/write process. In addition, since the offset value can be measured and stored in the offset storing part 2 before actually using the position signal generating circuit, it is possible to correct the offset of the position signal generating circuit caused by changes in circuit constants with age and the like.

Figure 4:
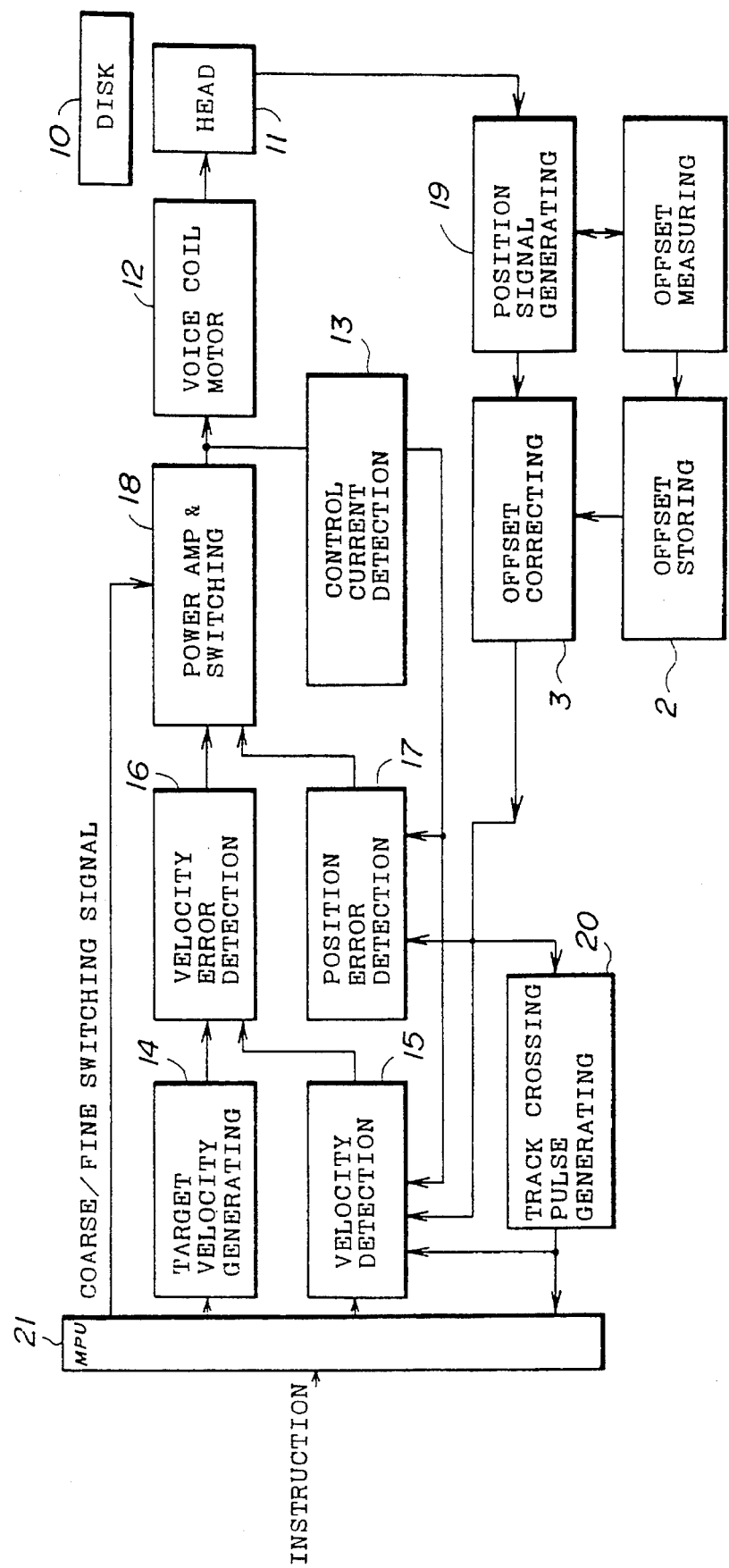
FIG. 4 is a system block diagram showing a first embodiment of an offset correcting system according to the present invention.
Figure 5:
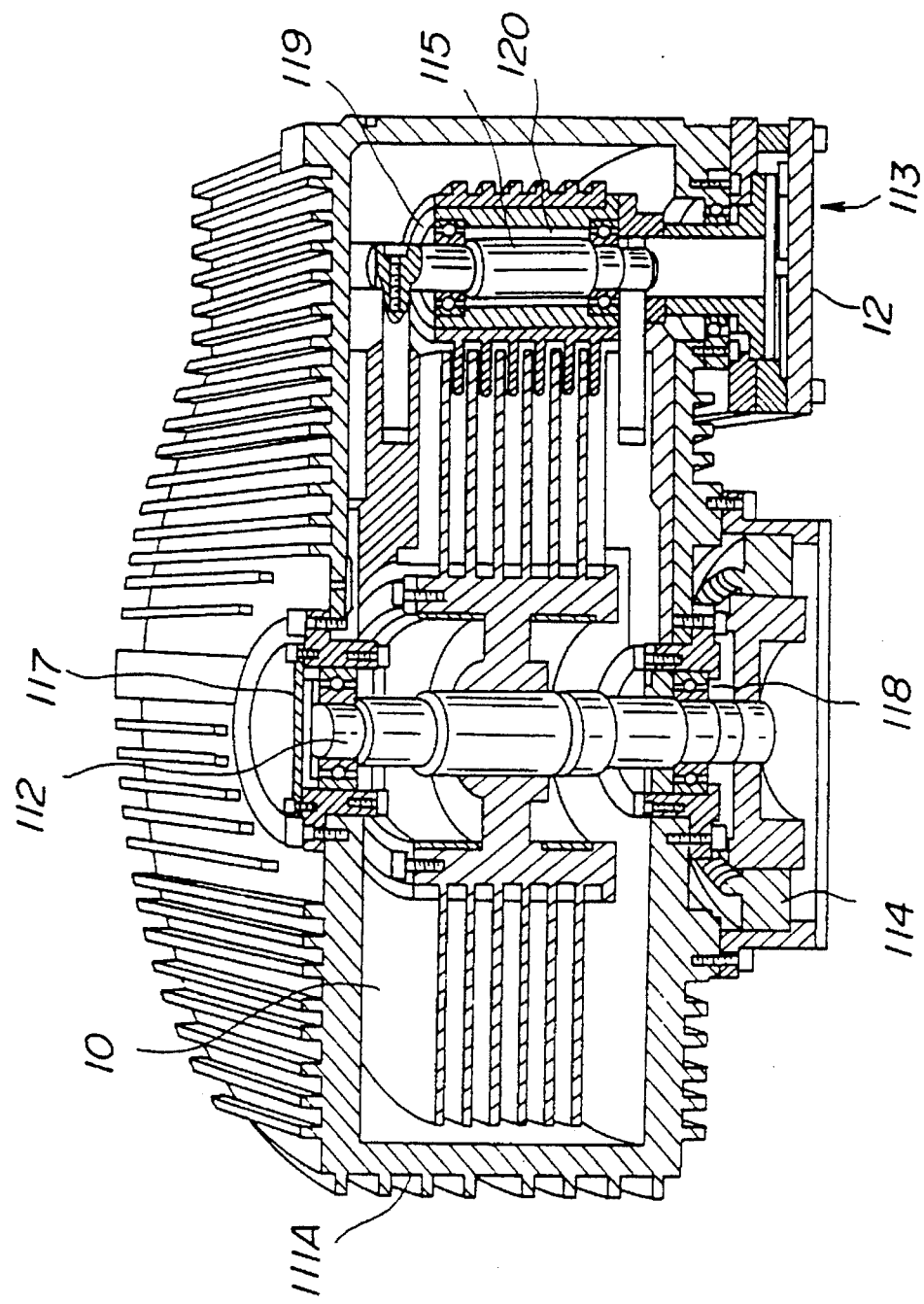
FIG. 5 is a cross sectional view showing a magnetic head and magnetic disk shown in FIG. 4.
Figure 6:
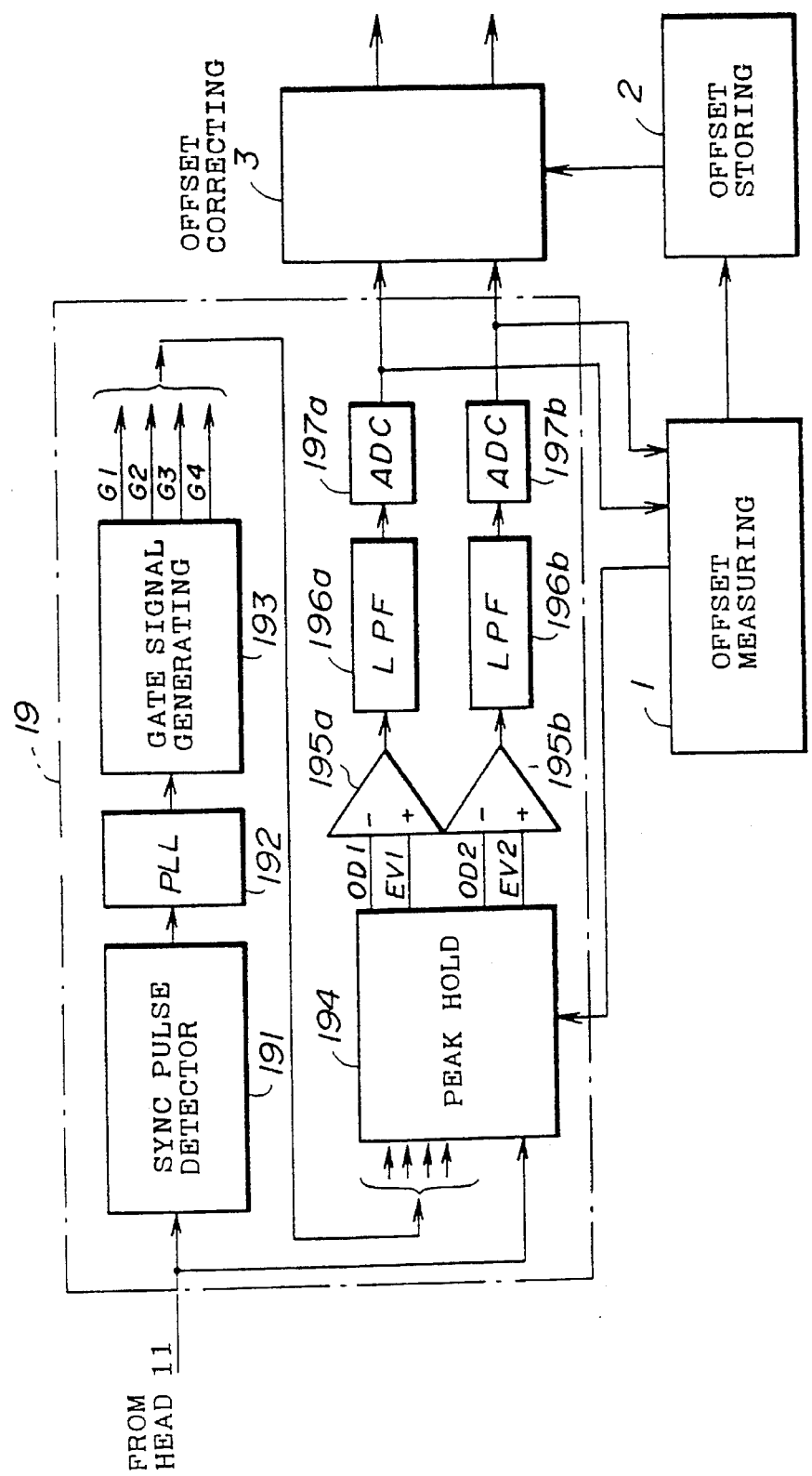
FIG. 6 is a system block diagram showing a position signal generating circuit shown in FIG. 4 in more detail.
Figure 7:
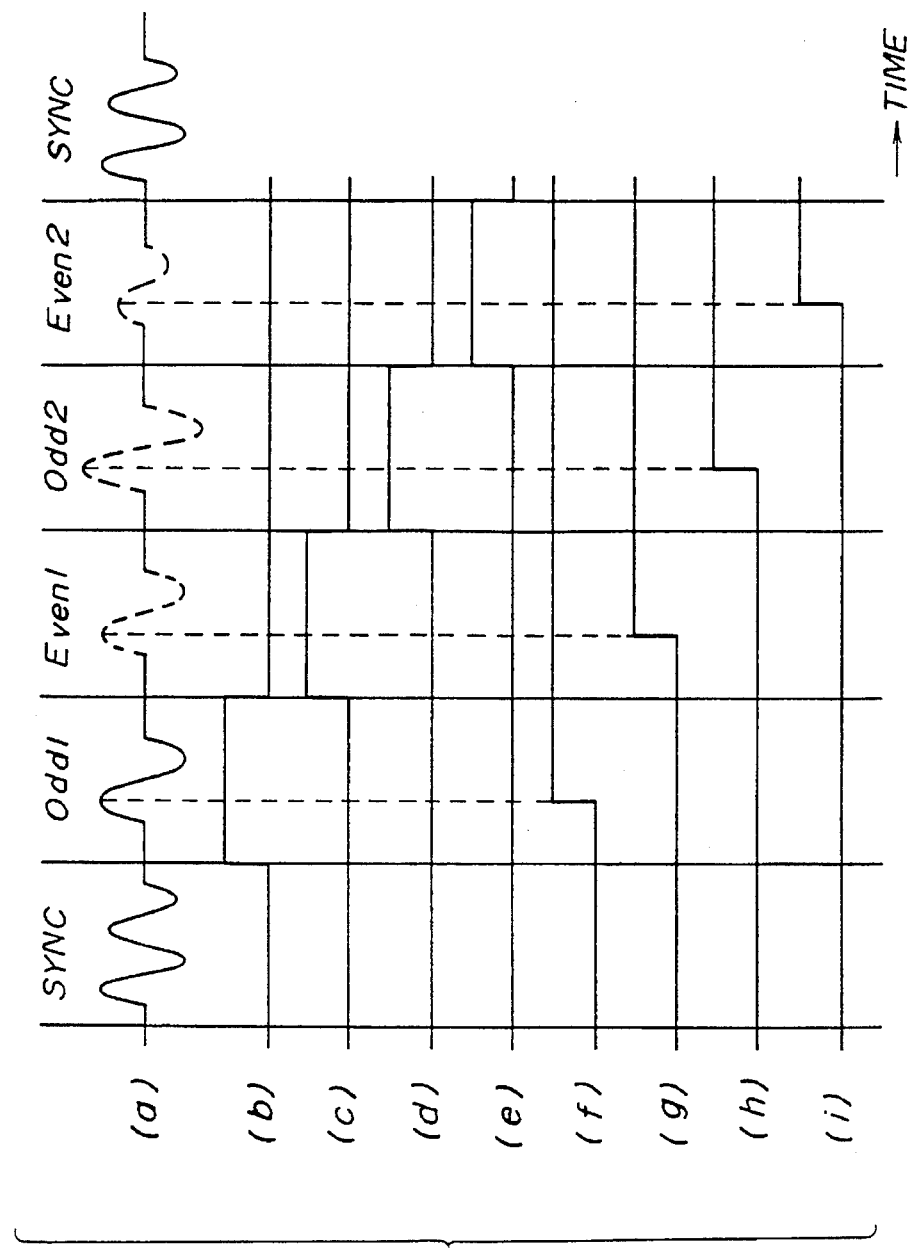
FIG. 7 is a timing chart for explaining an operation of a peak hold circuit shown in FIG. 6.

Next, a description will be given of a first embodiment of an offset correcting system according to the present invention, by referring to FIGS. 4 through 7. FIG. 4 shows the first embodiment applied to a magnetic disk unit, and FIG. 6 shows a position signal generating circuit shown in FIG. 4 in more detail. FIG. 5 shows a magnetic head and a magnetic disk shown in FIG. 4, and FIG. 7 is a timing chart for explaining an operation of a peak hold circuit shown in FIG. 6. In FIGS. 4 and 6, those parts which are the same as those corresponding parts in FIG. 3 are designated by the same reference numerals, and a description thereof will be omitted. This embodiment of the system employs an embodiment of a method of correcting the offset according to the present invention.

In FIG. 4, a magnetic head 11 writes data to and reads data from a magnetic disk 10. The magnetic disk 10 is one of a plurality of magnetic disks 10 accommodated within a shell part 111A of a housing as shown in FIG. 5. The housing supports a spindle 112 of a magnetic disk pack and a magnetic head positioner 113. In FIG. 5, six magnetic disks 10 are assembled in a stack around the spindle 112, but the number of magnetic disks may be varied depending on the memory capacity of the magnetic disk unit. The spindle 112 is supported at both ends by ball bearings 117 and 118. These bearings 117 and 118 contain a ferrofluidic seal which keeps airtight the space between the inside and outside separated by the bearing while assuring free rotation of the spindle 2.

The magnetic disks 10 are spaced with a predetermined distance between each other and are rotated by the spindle 112 which is powered by a D.C. motor 114 attached to one end of the spindle 112. The magnetic head positioner 113 has a similar structure as that of the known magnetic disk pack. The positioner 113 has arms (not completely shown) fixed to a spindle 115 which is supported by ball bearings 119 and 120. The spindle 115 is driven by a voice coil motor 12 to rotate about its axis to the left and right by a desired angle. Hence, the magnetic head 11 supported by the arms is brought to a desired position over the magnetic disk 10.

In FIG. 4, a control current detection circuit 13 detects a current which is supplied to the voice coil motor 12. A target velocity generating circuit 14 generates a target velocity with which the magnetic head 11 is to be moved based on an output signal of a micro processor unit (MPU) 21. A velocity detection circuit 15 detects a velocity of the moving magnetic head 11 based on output signals of the offset correcting part 3, the control current detection circuit 13, a track crossing pulse generating circuit 20 and the MPU 21. A velocity error detection circuit 16 detects a velocity error based on output signals of the target velocity generating circuit 14 and the velocity detection circuit 15, and supplies a seek current to the voice coil motor 12 via a power amplifier and switching part 18 depending on a difference between the output signals of the target velocity generating circuit 14 and the velocity detection circuit 15.

A position error detection circuit 17 outputs a seek current which is dependent on a difference between a specified track position and an actual track position of the magnetic head 11, based on the output signals of the offset correcting part 3 and the control current detection circuit 13. This seek current from the position error detection circuit 17 is supplied to the voice coil motor 12 via the power amplifier and switching part 18. The power amplifier and switching part 18 amplifies and selectively outputs one of the seek currents from the velocity error detection circuit 16 and the position error detection circuit 17 in response to a coarse/fine switching signal which is received from the MPU 21.

A position signal generating circuit 19 generates a position signal indicative of the position of the magnetic head 11 on the magnetic disk 10 based on the servo pattern which is read from the servo cylinders of the magnetic disk 10 by the magnetic head 11. The position signal generating circuit 19 will be described in more detail later in conjunction with FIG. 6.

The track crossing pulse generating circuit 20 generates a track crossing pulse when the magnetic head 11 crosses a boundary between two adjacent tracks, based on the position signal which is received from the position signal generating circuit 19 via the offset correcting part 3. This track crossing pulse is also supplied to the MPU 21.

The MPU 21 receives an instruction from a host (not shown) and carries out processes such as setting the target position, starting the seek operation, and selecting the coarse/fine control. The coarse/fine control corresponds to the selection of one of the velocity control and the position control, and the seek current from the velocity error detection circuit 16 or the position error detection circuit 17 is selectively supplied to the voice coil motor 12 in response to the coarse/fine switching signal.

As shown in FIG. 6, the position signal generating circuit 19 includes a synchronizing pulse detector 191, a phase locked loop (PLL) circuit 192, a gate signal generating circuit 193, a peak hold circuit 194, differential amplifiers 195a and 195b, lowpass filters 196a and 196b, and analog-to-digital converters (ADCs) 197a and 197b which are connected as shown.

The synchronizing pulse detection circuit 191 detects a synchronizing signal pulse from a signal which is induced in the coils of the magnetic head 11 due to the servo pattern signal of the magnetic disk 10. The PLL circuit 192 generates a pulse sequence in synchronism with the synchronizing pulse which is detected by the synchronizing pulse detection circuit 191. The gate signal generating circuit 193 generates four gate pulses G1, G2, G3 and G4 having mutually different phases based on the pulse sequence received from the PLL circuit 192. The gate pulses G1 through G4 are supplied to the peak hold circuit 194.

The peak hold circuit 194 includes four circuit parts for holding respective peak values of the servo pattern signal which is induced in the coils of the magnetic head 11 and for outputting signals OD1, EV1, OD2 and EV2. The differential amplifier 195a differentially amplifies the signals OD1 and EV1 from the peak hold circuit 194, and the differential amplifier 195b differentially amplifies the signals OD2 and EV2 from the peak hold circuit 194. The lowpass filter 196a eliminates noise from an output signal of the differential amplifier 195a, and the lowpass filter 196b eliminate noise from an output signal of the differential amplifier 195b. The ADC 197a converts an output signal of the lowpass filter 196a into a digital signal, and the ADC 197b converts an output signal of the lowpass filter 196b into a digital signal. The digital signals from the ADCs 197a and 197b are supplied to the offset measuring part 1 on one hand and to the offset correcting part 3 on the other.

FIG. 7(a) shows the servo pattern signal which is supplied to the peak hold circuit 194 from the magnetic head 11. FIG. 7(b), (c), (d) and (e) respectively show the gate signals G1, G2, G3 and G4 output from the gate signal generating circuit 193. In addition, FIG. 7(f), (g), (h) and (i) respectively show the signals OD1, EV1, OD2 and EV2 output from the peak hold circuit 194.

Figure 1:
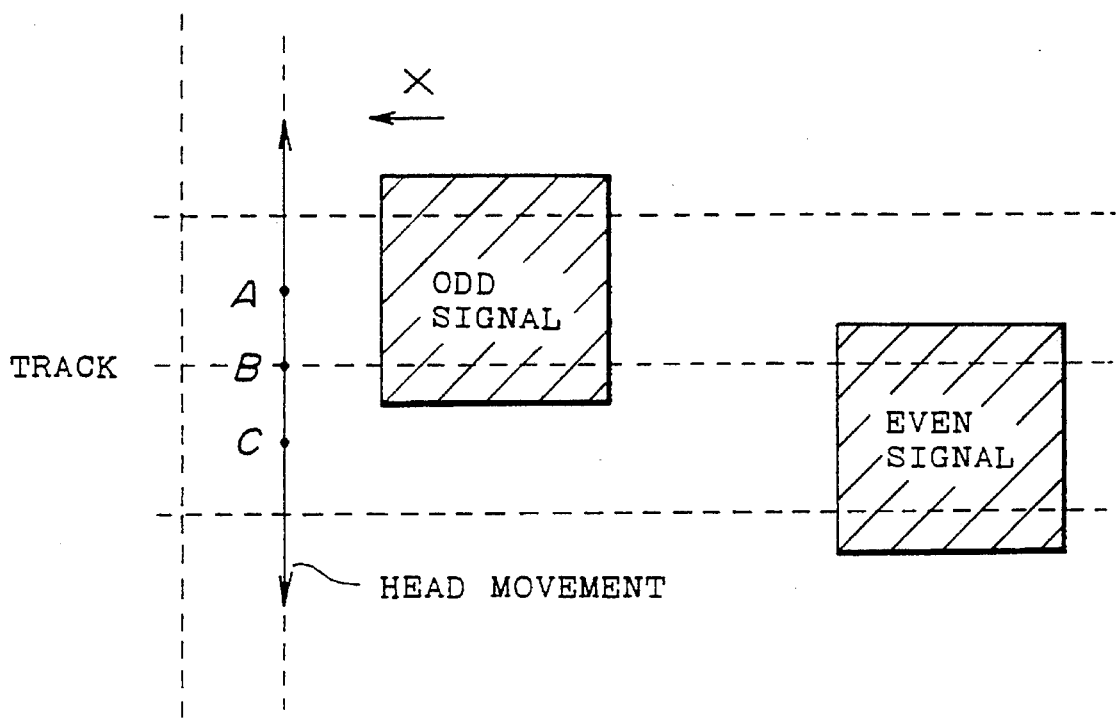
FIG. 1 is a diagram for explaining a servo pattern of servo cylinders.
Figure 2:
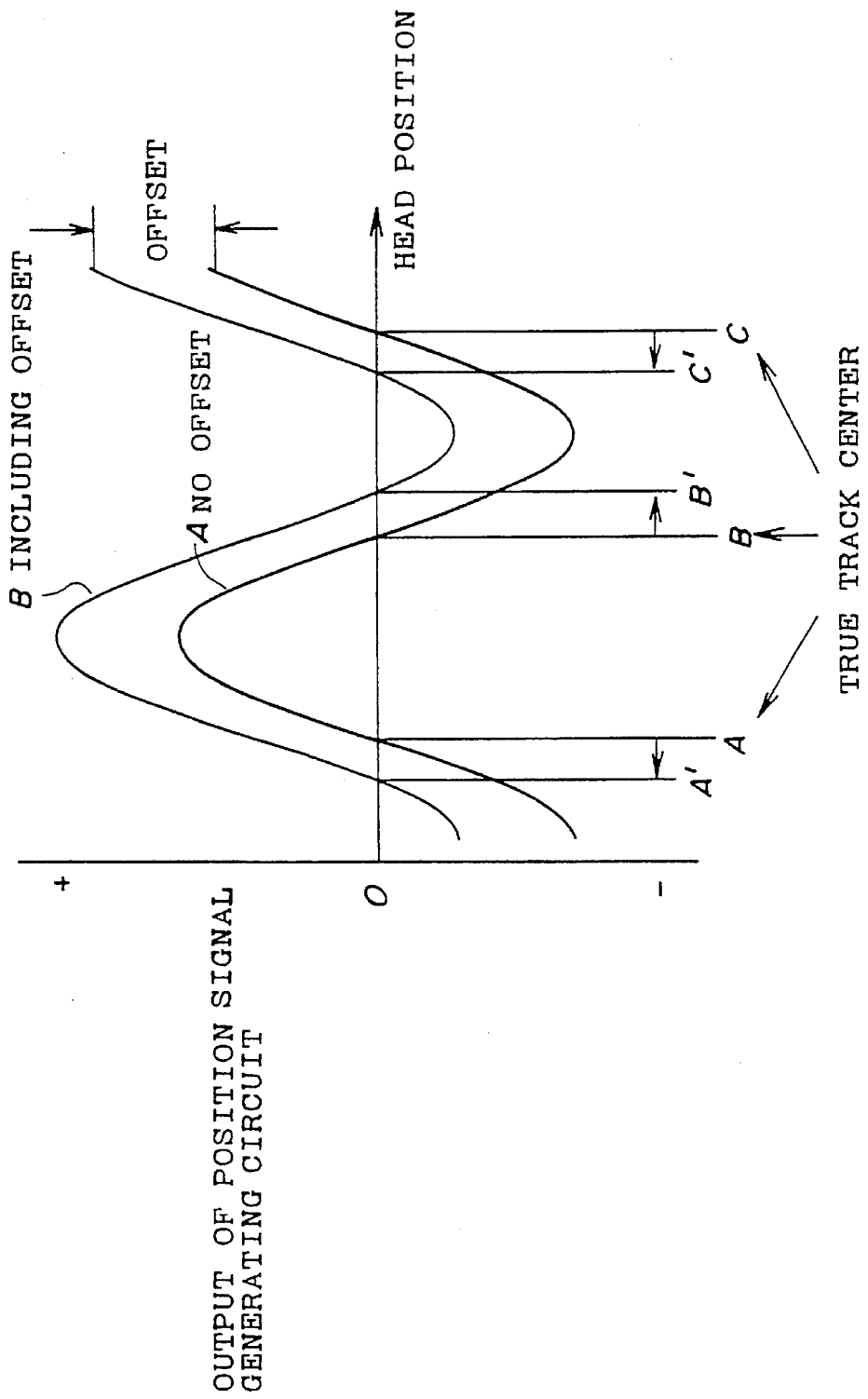
FIG. 2 shows an output signal waveform of a position signal generating circuit.

As shown in FIG. 7(a), the servo pattern signal which is supplied to the peak hold circuit 194 from the magnetic head 11 time-divisionally includes a synchronizing signal SYNC and signals Odd1, Even1, Odd2 and Even2. As described above in conjunction with FIG. 1, the voltages of these signals depend on the positional relationship of the servo pattern position of the servo cylinders and the magnetic head 11.

The synchronizing pulse detector 191 detects the synchronizing signal SYNC in the synchronizing period of the servo pattern signal shown in FIG. 7(a), and the gate signals G1 through G4 shown in FIG. 7(b) through (e) are output from the gate signal generating circuit 194 based on the output signal of the synchronizing pulse detector 191 which is received via the PLL circuit 192. Hence, the circuit parts of the peak hold circuit 194 respectively hold the maximum voltage of the servo pattern signal during the pulse intervals of the gate signals G1 through G4 and output the signals OD1, EV1, OD2 and EV2 shown in FIG. 7(f), (g), (h) and (i).

Next, a description will be given of the seek operation in which the magnetic head 11 is moved from one track on the magnetic disk 10 to a target track on the magnetic disk 10. When a seek instruction is supplied to the MPU 21 from the host (not shown), the MPU 21 controls the target velocity generating circuit 14 based on the seek instruction. The seek instruction includes the target track position, and the target velocity generating circuit 14 generates an optimum target velocity for moving the magnetic head 11 to the target track position. This target velocity is supplied to the velocity error detection circuit 16.

On the other hand, the velocity detection circuit 15 calculates the actual velocity with which the magnetic head 11 is moving, based on the output signal of the position signal generating circuit 19 which is received via the offset correcting part 3. This actual velocity of the magnetic head 11 is supplied to the velocity error detection circuit 16. Hence, the velocity error detection circuit 16 detects the error between the target velocity and the actual velocity, and generates the seek current which is dependent on the difference between the output signals of the target velocity generating circuit 14 and the velocity detection circuit 15. This seek current from the velocity error detection circuit 16 is supplied to the voice coil motor 12 via the power amplifier and switching part 18, so as to move the magnetic head 11.

The MPU 21 processes the track crossing pulse which is received from the track crossing pulse generating circuit 20, and generates the coarse/fine switching signal which switches the control from the velocity control to the position control when the magnetic head 11 reaches the target track position. This coarse/fine switching signal is supplied to the power amplifier and switching part 18, and the seek current from the position error detection circuit 17 is supplied to the voice coil motor 12 via the power amplifier and switching part 18.

The seek operation ends when the magnetic head 11 stops at the target track position.

Next, a description will be given of the operation of the offset measuring part 1.

The offset measuring part 1 measures the offset value of the position signal generating circuit 19 before the normal operation of the magnetic disk unit starts or during a free time in which no data read/write process is carried out. First, the offset measuring part 1 adjusts the voltage of the servo pattern signal which is supplied to the peak hold circuit 194 from the magnetic head 11 to a zero potential. Second, the offset measuring part 1 stores the digital signals which are output from the ADCs 197a and 197b in this state into the offset storing part 2. Hence, the measured offset value is the total offset generated in the entire analog circuit part of the position signal generating circuit 19. Of course, various methods may be employed to adjust the voltage of the servo pattern signal to the zero potential. For example, the effect is the same as setting the servo pattern signal to the zero potential when the peak values held in the peak hold circuit 194 are reset to zero. This may be achieved by supplying a control signal from the offset measuring part 1 to the peak hold circuit 194 to reset the held peak values.

Next, a description will be given of the operation of the offset correcting part 3.

The offset correcting part 3 operates after the offset values are stored in the offset storing part 2. The offset correcting part 3 subtracts from the output value of the offset values read from the offset storing part 2 the corresponding digital values which are read from the offset storing part 2, so as to correct the offset of the position signal generating circuit 19.

Figure 10:
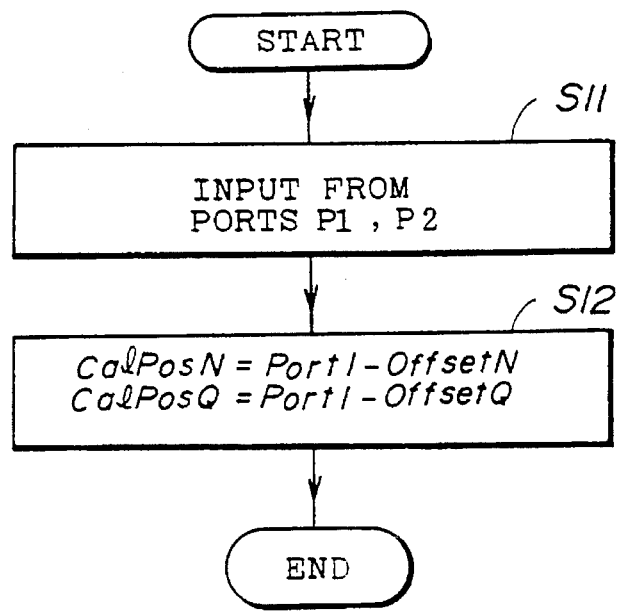
FIG. 10 is a flow chart for explaining an offset correcting operation of the second embodiment.
Figure 8:
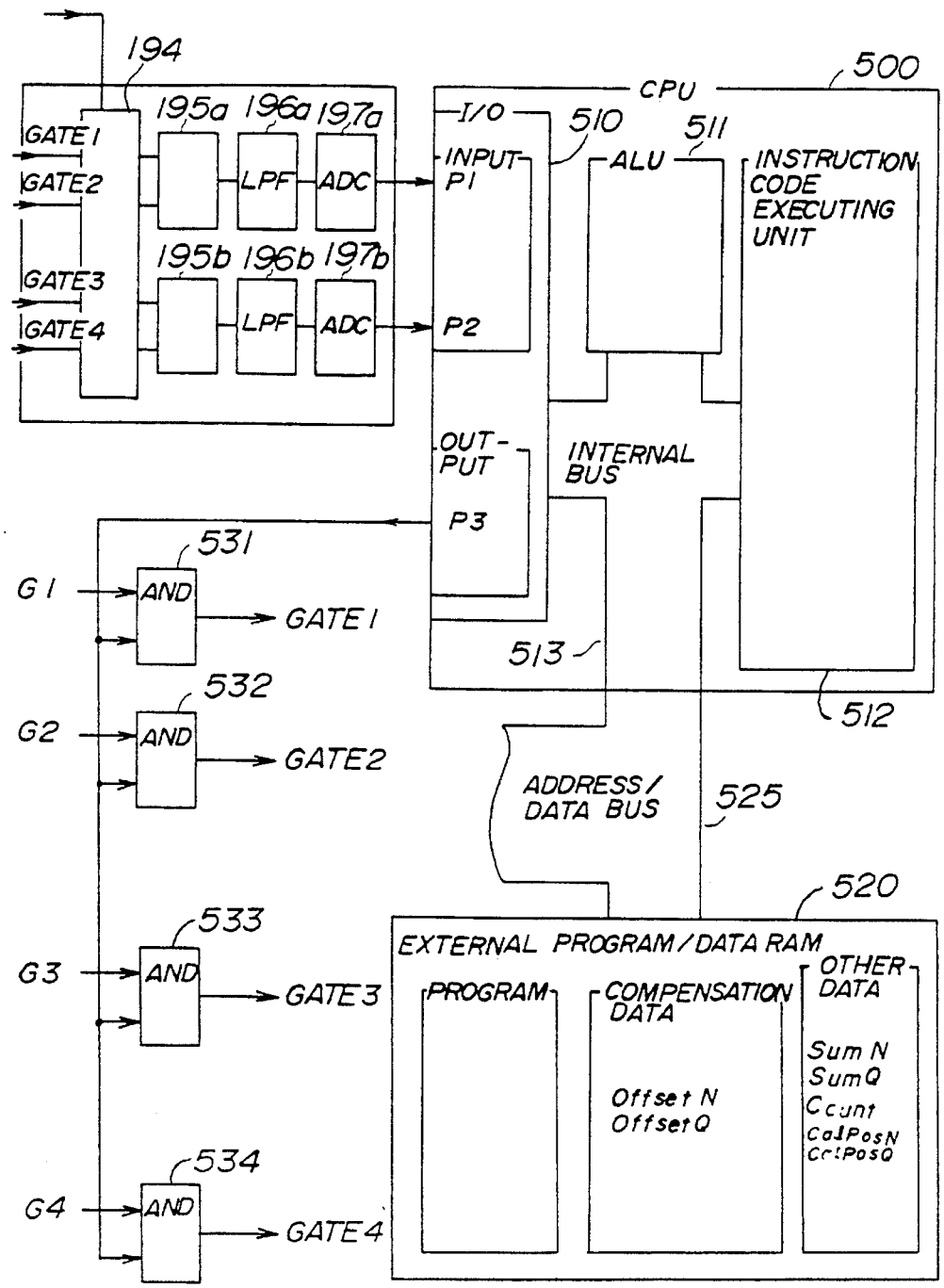
FIG. 8 is a system block diagram showing a second embodiment of the offset correcting system according to the present invention.
Figure 9:
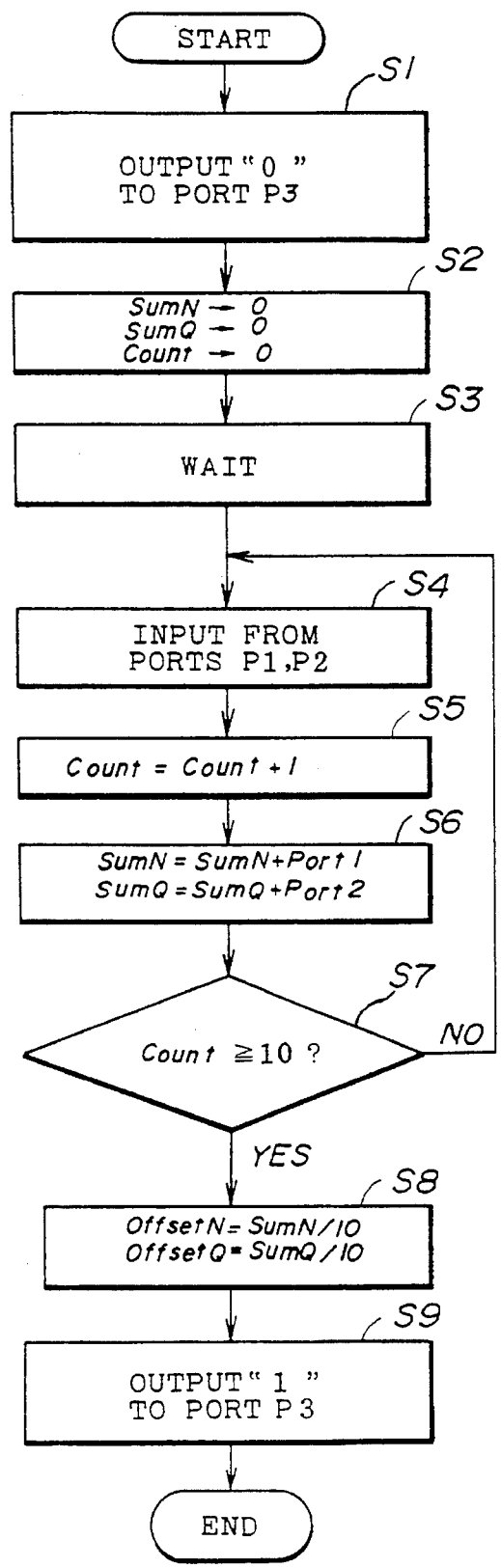
FIG. 9 is a flow chart for explaining an offset measuring operation of the second embodiment.

Next, a description will be given of a second embodiment of the offset correcting system according to the present invention, by referring to FIGS. 8, 9 and 10. FIG. 8 shows an essential part of the second embodiment. FIG. 9 is a flow chart for explaining the offset measuring operation of the second embodiment, and FIG. 10 is a flow chart for explaining the offset correcting operation of the second embodiment. In FIG. 8, those parts which are the same as those corresponding parts in FIG. 6 are designated by the same reference numerals, and a description thereof will be omitted.

In this embodiment, the functions of the offset measuring part 1 and the offset correcting part 3 are carried out by a central processing unit (CPU) 500 shown in FIG. 8. The CPU 500 includes an input/output port 510 having input ports P1 and P2 and an output port P3, an arithmetic logic unit (ALU) 511, and an instruction code executing unit 512 which are coupled via an internal bus 513. A random access memory (RAM) 520 corresponds to the offset storing part 2. The RAM 520 may be a non-volatile memory. This RAM 520 is coupled to the internal bus 513 of the CPU 500 via an address/data bus 525. The input port P1 receives the output digital signal of the ADC 197a, and the input port P2 receives the output digital signal of the ADC 197b.

A series of programs are stored in a program region of the RAM 520, and these programs are executed by the instruction code executing unit 512 of the CPU 50 by driving the ALU 511, the input/output port 510 and the internal bus 513. A control signal is output from the output port P3 and supplied in common to first input terminals of four AND circuits 531 through 534. In addition, the output gate signals G1 through G4 of the gate signal generating circuit 193 shown in FIG. 6 are respectively supplied to second input terminals of the AND circuits 531 through 534. Output signals GATE1 through GATE4 of the AND circuits 531 through 534 are supplied to the peak hold circuit 194.

During the normal operation of the magnetic disk unit such as during the seek operation, the CPU 500 outputs a control signal "1" from the output port P3. As a result, all of the gates of the AND circuits 531 through 534 are opened, and the gate signals G1 through G4 are supplied to the peak hold circuit 194 as the signals GATE1 through GATE4. On the other hand, during the offset measuring operation, the CPU 500 outputs a control signal "0" from the output port P3. In this case, all of the gates of the AND circuits 531 through 534 are closed, and the gate signals G1 through G4 are blocked from being supplied to the peak hold circuit 194. In other words, the signal "0" is input to the peak hold circuit 194, and the peak values held in the peak hold circuit 194 becomes reset to zero.

The offset measuring operation of this embodiment will now be described in conjunction with FIG. 9 which shows the operation of the CPU 500. In FIG. 9, a step S1 outputs the control signal "0" to the output port P3. A step S2 makes an initialization by substituting "0" into "SumN", "SumQ" and "Count", where "SumN" and "SumQ" denote regions of the RAM 520 for storing a sum total when obtaining an average value of the offset value and "Count" denotes the count in an internal counter for counting a number of samples when obtaining the average value. In addition, a step S3 waits a predetermined time (100 ms, for example) until the transient phenomenon of analog circuits within the position signal generating circuit 19 settles.

Then, a step S4 inputs the output values of the ADCs 197a and 197b via the respective input ports P1 and P2. A step S5 increments "Count" by one, and a step S6 adds the output value of the ADC 197a to "SumN" and adds the output value of the ADC 197b to "SumQ". A step S7 decides whether or not "Count" is greater than or equal to 10, and the process returns to the step S4 if the decision result in the step S7 is NO.

On the other hand, if the decision result in the step S7 is YES, a step S8 calculates OffsetN=SumN/10 and OffsetQ=SumQ/10, and stores "OffsetN" and "OffsetQ" in the RAM 520. The "OffsetN" and "OffsetQ" are the calculated offset values. Finally, a step S9 outputs a control signal "1" from the output port P3 so as to return the peak hold circuit 194 to the normal operation, and the process ends.

The offset correcting operation of this embodiment will now be described in conjunction with FIG. 10 which shows the operation of the CPU 500. In FIG. 10, a step S11 inputs the output values of the ADCs 197a and 197b via the input ports P1 and P2. Then, a step S12 calculates CalPosN=Port1−OffsetN and CalPosQ=Port2−OffsetQ and stores "CalPosN" and "CalPosQ" in the RAM 520. The "CalPosN" and "CalPosQ" are the corrected position signal data, and may be read out from the RAM 520 and output via the address/data bus 525 under the control of the CPU 500. The corrected position signal data are supplied to the velocity detection circuit 15, the position error detection circuit 17 and the track crossing pulse generating circuit 20 shown in FIG. 4 via the address/data bus 525.

Further, the present invention is not limited to these embodiments, but various variations and modifications may be made without departing from the scope of the present invention.

What is claimed is:

1. A method of correcting an offset of a position signal generating circuit which generates a position signal indicative of a position of a magnetic head on a magnetic disk based on a servo signal read from the magnetic disk in a magnetic disk unit, said position generating circuit generating gate signals and including a peak hold circuit, said peak hold circuit holding and producing an output comprising a peak level of the servo signal during a first logic value of the gate signals and zero during a second logic value of the gate signals, said position generating circuit generating the position signal based on the output of the peak hold circuit, said method comprising the steps of:

(a) forcibly setting the gate signals to the second logic value;

(b) generating the position signal while the gate signals are set to the second logic value;

(c) measuring the position signal generated by said step (b) as an offset value of the position signal generating circuit;

(d) storing the measured offset value in a storing part; and (e) correcting an output value of the position signal generating circuit based on the offset value which is read from the storing part.

2. The method as claimed in claim 1, wherein said step (c)

measures the offset value of the position signal generating circuit before the beginning of a normal operation of the magnetic disk unit.

3. The method as claimed in claim 1, wherein said step (c) measures the offset value of the position signal generating circuit during a free time in which no data read/write process is carried out in the magnetic disk unit.

4. The method of correcting an offset of a position signal generating circuit as claimed in claim 1, wherein:

a microprocessor unit is coupled to said position generating circuit and said position signal generating circuit further comprises analog-to-digital converters converting the output of said peak hold circuit to input to said microprocessor unit, said step (c) further comprises a step of blocking, by said microprocessor unit, said gate signals from being supplied to said peak hold circuit when the offset value of the position signal generating circuit is being measured, step (d) further comprises the step of storing, by said microprocessor unit, the measured offset value, and said step (e) further comprises the step of correcting, by the microprocessor unit, the position signal by carrying out an operation.

5. A method of correcting an offset of a position signal generating circuit which generates a position signal indicative of a position of a magnetic head on a magnetic disk based on a servo signal read from the magnetic disk in a magnetic disk unit, said method comprising the steps of:

(a) measuring an offset value of the position signal generating circuit, said position signal generating circuit including a peak hold circuit holding peaks of the servo signal read by the magnetic head, and having each peak value held in said peak hold circuit within the position signal generating circuit forcibly reset to zero when the offset value of the position signal generating circuit is being measured;

(b) storing the measured offset value in a storing part; and (c) correcting an output value of the position signal generating circuit based on the offset value which is read from the storing part.

6. An offset correcting system for correcting an offset of a position signal generating circuit which generates a position signal indicative of a position of a magnetic head on a magnetic disk based on a servo signal read from the magnetic disk in a magnetic disk unit, said offset correcting system comprising:

offset measuring means, coupled to the position signal generating circuit, for measuring an offset value of the position signal generating circuit, said position signal generating circuit further generating gate signals and comprising a peak hold circuit holding and outputting the peak level of input signals when said gate signals are not set to zero and outputting zero when the gate signals are set to zero, said position signal being generated from the output of the peak hold circuit, and said peak hold circuit receiving the gate signals set to zero as input signals and outputting zero when the offset value of the position signal generating circuit is being measured;

offset storing means for storing the offset value measured by said offset measuring means; and offset correcting means for correcting an output value of the position signal generating circuit based on the offset value which is read from said offset storing means.

7. The offset correcting system as claimed in claim 6, wherein said offset measuring means measures the offset value of the position signal generating circuit before a normal operation of the magnetic disk unit starts.

8. The offset correcting system as claimed in claim 6, wherein said offset measuring means measures the offset value of the position signal generating circuit during a free time in which no data read/write process is carried out in the magnetic disk unit.

9. The offset correcting system as claimed in claim 6, wherein said offset measuring means and said offset correcting means form a micro processor unit, and said offset storing means is made up of a random access memory which is coupled to the micro processor unit.

10. The offset correcting system as claimed in claim 9, wherein the random access memory is a non-volatile memory.

11. The offset correcting system as claimed in claim 6, wherein the position signal generating circuit further comprises:

a differential amplifier for differentially amplifying the peaks held in the peak hold circuit, a lowpass filter for eliminating noise from an output signal of the differential amplifier, and an analog-to-digital converter for converting an output signal of the lowpass filter into a digital signal which is output as the position signal.

12. The offset correcting system as claimed in claim 6, wherein said offset measuring means measures an offset value which is generated in the entire analog circuit part of the position signal generating circuit.

13. The system of correcting an offset of a position signal generating circuit as claimed in claim 6, wherein:

a microprocessor unit is coupled to said position generating circuit and said position signal generating circuit further comprises analog-to-digital converters, said offset measuring means further comprises said analog-to-digital converters converting the output of said peak hold circuit to input to said microprocessor unit and said microprocessor unit blocking said gates signals from being supplied to said peak hold circuit when the offset value of the position signal generating circuit is being measured, the offset storing means further comprises said microprocessor unit storing the measured offset value, and said offset correcting means further comprises the microprocessor unit correcting the position signal by carrying out an operation.

14. An offset correcting system for correcting an offset of a position signal generating circuit which generates a position signal indicative of a position of a magnetic head on a magnetic disk based on a servo signal read from the magnetic disk in a magnetic disk unit, said offset correcting system comprising:

offset measuring means, coupled to the position signal generating circuit, for measuring an offset value of the position signal generating circuit, said position signal generating circuit further comprising a peak hold circuit holding and outputting peaks of servo signals read by the magnetic head, and said offset measuring means measuring the offset value of the position signal generating circuit by forcibly resetting each peak value held in the peak hold circuit;

offset storing means for storing the offset value measured by said offset measuring means; and offset correcting means for correcting an output value of the position signal generating circuit based on the offset value which is read from said offset storing means.

* * * * *